US 011048561B2

(12) United States Patent
Kurkure et al.

(10) Patent No.: US 11,048,561 B2
(45) Date of Patent: Jun. 29, 2021

(54) AVOIDING POWER-ON FAILURES IN VIRTUALIZED GPUS

(71) Applicant: VMware, Inc., Palo Alto, CA (US)

(72) Inventors: Uday Pundalik Kurkure, Los Altos Hills, CA (US); Hari Sivaraman, Livermore, CA (US); Lan Vu, Palo Alto, CA (US)

(73) Assignee: VMware, Inc., Palo Alto, CA (US)

( * ) Notice: Subject to any disclaimer, the term of this patent is extended or adjusted under 35 U.S.C. 154(b) by 159 days.

(21) Appl. No.: 16/520,080

(22) Filed: Jul. 23, 2019

(65) Prior Publication Data

US 2021/0026672 A1 Jan. 28, 2021

(51) Int. Cl.
*G06F 9/50* (2006.01)
*G06F 9/455* (2018.01)
*G06F 9/4401* (2018.01)
*G06F 9/38* (2018.01)

(52) U.S. Cl.
CPC .......... *G06F 9/5083* (2013.01); *G06F 9/3877* (2013.01); *G06F 9/4401* (2013.01); *G06F 9/45558* (2013.01); *G06F 9/505* (2013.01); *G06F 2009/4557* (2013.01); *G06F 2009/45595* (2013.01)

(58) Field of Classification Search
CPC .... G06F 9/5083; G06F 9/505; G06F 9/45558; G06F 9/4401; G06F 9/3877; G06F 2009/45595; G06F 2009/4557
See application file for complete search history.

(56) References Cited

U.S. PATENT DOCUMENTS

| 9,733,963 B2 * | 8/2017 | Hansson ............... G06T 1/20 |
| 10,725,885 B1 * | 7/2020 | Paraschiv ........... G06F 9/5027 |
| 2020/0394748 A1 * | 12/2020 | Wilt .................... G06T 1/20 |

OTHER PUBLICATIONS (2019) "Virtual GPU Software User Guide," NVIDIA Developer Documentation, https://docs.nvidia.com/grid/latest/grid-vgpu-user-guide/index.html.
U. Kurkure; et al (2018) "Virtualized GPUs in High Performance Data Centers", in the 16th IEEE International Conference on High Performance Computing and Simulation.
(Continued)

*Primary Examiner* — Jacob D Dascomb
(74) *Attorney, Agent, or Firm* — Thomas | Horstemeyer, LLP

(57) ABSTRACT

Various examples are disclosed for avoiding power-on failures during virtualization of graphics processing units. A computing environment can be directed to, in response to a virtual machine being powered on, identify a profile for a virtual graphics processing unit (vGPU) designated for the virtual machine, the profile specifying an amount of memory required by the vGPU, identify that the virtual machine is unable to be assigned to any of a plurality of physical graphics processing units (GPUs) based on the amount of memory required by the vGPU, free fat least the amount of memory required by the vGPU by performing a migration of at least one existing virtual machine from a first one of the physical GPUs to a second one of the physical GPUs, and assign the virtual machine to an available one of the physical GPUs and a corresponding host.

20 Claims, 7 Drawing Sheets

(56) References Cited

OTHER PUBLICATIONS

J. Duato; et al (2009) "An Efficient Implementation of GPU Virtualization in High Performance Clusters", in 4 th Workshop on Virtualization in High Performance Cloud Computing.

Lan Vu; et al (2014) "GPU Virtualization for High Performance General Purpose Computing on the ESX Hypervisor", in Proc. of the 22nd High Performance Computing Symposium.

R. Olson; et al (2019) "NVIDIA Docker: GPU Server Application Deployment Made Easy," https://devblogs.nvidia.com/parallelforall/nvidia-docker-gpu-server-application-deployment-made-easy.

U. Kurkure; et al (2017) "Machine Learning Using Virtualized GPUs in Cloud Environment", The 12th Workshop on Virtualization in High Performance Cloud Computing.

P. Markthub; et al (2014) "Using rCUDA to Reduce GPU Resource-Assignment Fragmentation caused by Job Schedule," 2014 15th International Conference on Parallel and Distributed Computing, Applications and Technologies, pp. 105-112.

A. Herrera (2015) "NVIDIA Grid vGPU: Delivering Scalable Graphics-Rich Virtual Desktops" NVIDIA Whitepaper.

J. Duato; et al (2010) "Modeling the CUDA Remoting Virtualization Behaviour in High Performance Networks", in First Workshop on Language, Compiler, and Architecture Support for GPGPU.

A. J. Peña; et al (2014) "A Complete and Efficient CUDA-Sharing Solution for HPC Clusters." in Parallel Computer, 40 (10).

V. Gupta; et al (2011) "Pegasus: Coordinated Scheduling for Virtualized Accelerator-based systems" in the Proceedings of USENIX ATC.

V. Gupta; et al (2009) "GViM: GPU-Accelerated Virtual Machines", in Proceedings of the 3rd Workshop on System-level Virtualization for High Performance Computing, NY, USA: ACM, pp. 17-24.

A. Merritt; et al (2011) "Shadowfax: Scaling in Heterogeneous Cluster Systems via GPGPU Assemblies", in the Proceedings of VTDC.

L. Shi; et al (2009) "vCUDA: GPU Accelerated High Performance Computing in Virtual Machines," in Proceedings of IEEE International Symposium on Parallel & Distributed Processing (IPDPS'09).

(2019) "Remote Desktop Services in Windows," https://docs.microsoft.com/en-us/windows-server/remote/remote-desktop-services/welcome-to-rds.

* cited by examiner

```
status powerOn(vm)
{
  vgpu_profile=get_vgpu_profile(vm);

gpu_list= PROFILE_TO_GPU["no-profile"]
    If notEmpty(gpu_list) {
      gpu=get_gpu(gpu_list) // get any gpu from the list
      remove_from_list(PROFILE_TO_GPUS["no-profile"],gpu)
      PlaceAndPowerOn(vm, gpu)
      return success;
    } gpu_list = PROFILE_TO_GPU_ID[vgpu_profile];

foreach gpu in gpu_list {
      if GPU_TO_NUM_VMS[gpu] <   PROFILE_TO_MAX_VMS[vgpu_profile]  {
      GPU_TO_NUM_VMS[gpu]++;
      PlaceAndPowerOn(vm, gpu)
      return success;
      }
    }
    // Consolidate Virtual Machines
    foreach profile do
     if (profile != no_profile and profile != vgpu_profile and
      vgpu_profile != "P40-24q")
     {
        // we already looked at  gpu_lists pointed to to by
        // "no-profile" and vgpu-profile. The highest 24Q profile
        // gpu can only run one VM. So, no need to look at it.

gpu=freeupGPU(profile);

if (gpu != -1) {
             GPU_TO_VMS[gpu]++;
             insert_list(PROFILE_TO_GPUS[profile],gpu)
             PlaceAndPowerOn(vm, gpu);
             return success;
          }
      }
    } //foreach
  return -1
}
```

- 303 (braces around first block)
- 306 (braces around second block)
- 309 (braces around third block)

FIG. 3

```
int freeupGPU(profile)
{
  // Check to See If Freeing Up Is Possible
  gpu_list=PROFILE_TO_GPU_IDS[profile]
  sum=0;
  foreach gpu in gpu_list {
    sum += GPU_TO_NUM_VMS[gpu]
  } if( sum >= num_gpus_in_list * PROFILE_TO_MAX_VMS[profile]){
      return -1;
  }
  // Move Virtual Machines to free up a GPU
  gpu = get_gpu_with_minimum_vms(gpu_list);
  num_vms= GPU_TO_NUM_VMS[gpu];
  //Remove GPU from gpu_list PROFILE_TO_GPUS[profile]
  remove_gpu_from_PROFILE_TO_GPUS[profile]
  for (i=0;i < num_vms;i++){
    vmMigration(vm[i],gpu, gpu_list[0])
    sort_gpu_list_increasing_order_of_vms(gpu_list)
  }
  return gpu
}
```

– 403 (first block through the foreach loop)
– 406 (remainder)

FIG. 4

```
vmMigration(vm, gpu, dest_gpu) {
  call_vmotion_api(vm, gpu, dest_gpu)
  GPU_TO_NUM_VMS[gpu]--
  GPU_TO_NUM_VMS[dest_gpu]++
}
```

AVOIDING POWER-ON FAILURES IN VIRTUALIZED GPUS

BACKGROUND

Data centers include various physical and virtual components that, when executed, provide web services, cloud computing environments, virtualization environments, as well as other distributed computing systems. For instance, data centers can include hardware and software to provide computer virtualization services, which relate to the creation of a virtualized version of a physical device, such as a server, a storage device, a central processing unit (CPU), a graphics processing unit (GPU), or other computing resources. Data centers can also include virtual machines (VMs), which include emulations of a computer system that can be customized to include a predefined amount of random access memory (RAM), hard drive storage space, as well as other computing resources that emulate a physical machine.

Additionally, data centers can include resources that provide virtualized components of a computing device, such as a virtual graphics processing unit (vGPU). The virtualization of physical GPUs poses many challenges for the management of virtual machines associated with a virtual GPU. For instance, a virtualized GPU has an amount of memory that must be reserved on a physical GPU. As such, the maximum number of virtual GPU-enabled VMs running on each GPU can vary depending on the amount of memory required by a virtual GPU. Therefore, even if a sufficient amount of GPU resources are available to power on a VM, vGPU-enabled virtual machines often fail to power on.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

FIG. 3 illustrates example pseudocode for powering on a virtual machine.

FIGS. 4-5 illustrate examples of pseudocode for performing migrations or consolidations of virtual machines on physical graphics processing units.

DETAILED DESCRIPTION

Figure 1:
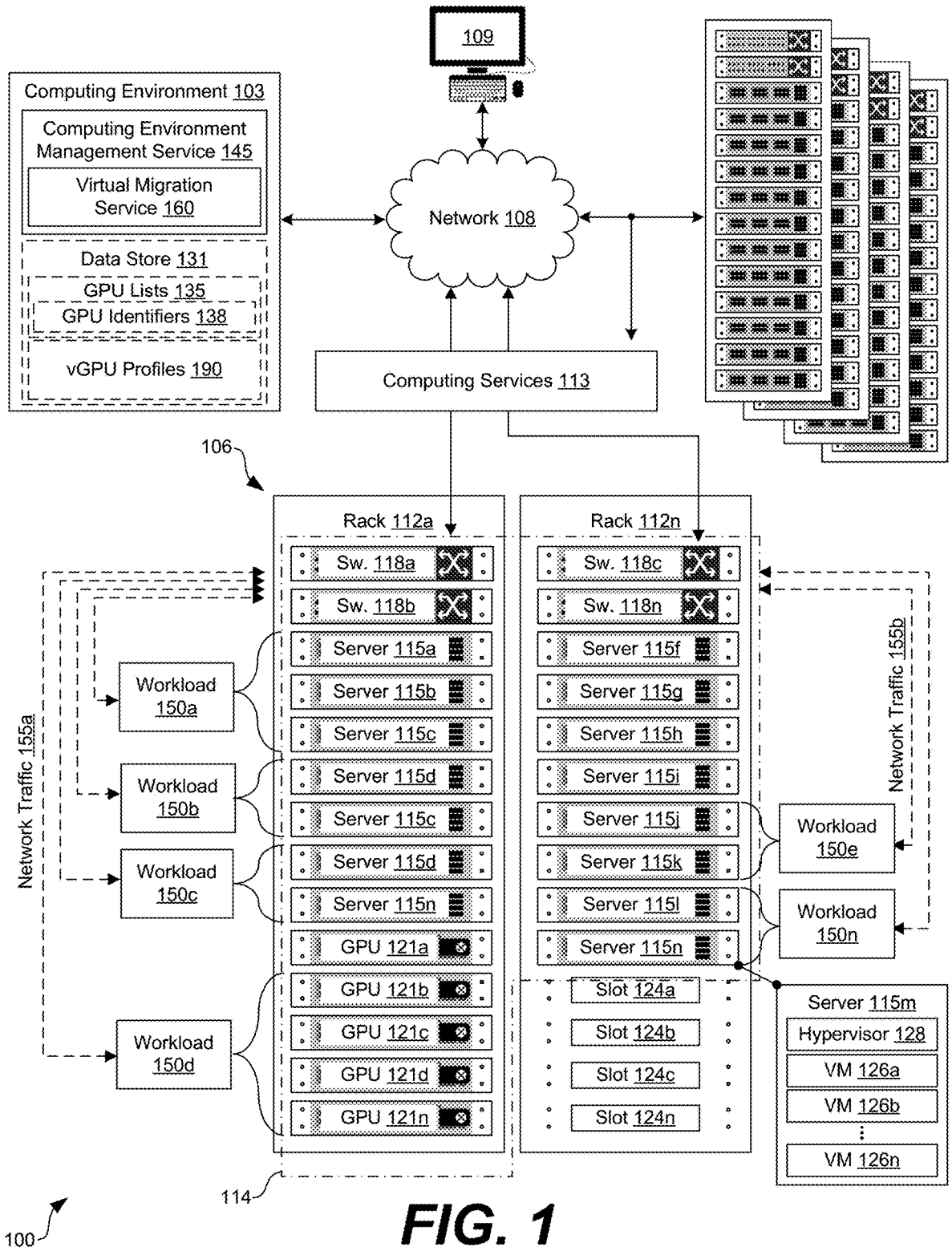
FIG. 1 is a drawing of an example of a networked computing environment having a computing environment management service and a virtual migration service avoiding power-on failures in virtualized GPUs in the networked computing environment.

The present disclosure relates to avoiding power-on failures in virtualized GPUs and similar systems. The virtualization of graphics processing units (GPUs) poses many challenges for the management of virtual machines that utilize virtual GPUs (vGPUs). Notably, a virtual GPU has a profile designating an amount of memory, such as graphics memory, that must be reserved for execution of the virtual GPU on an underlying physical GPU. Due to memory constraints, the maximum number of vGPU-enabled virtual machines running on each GPU can vary. Therefore, even if sufficient GPUs resources are available to power on virtual machines, vGPU-enabled virtual machines often fail to power on successfully.

For instance, some types of GPUs, such as those manufactured by NVIDIA®, only permit a single profile being assigned to a GPU. Therefore, all virtual machines placed on this GPU must have the same profile. For example, if a 1q-vGPU profile is assigned to a GPU, then all subsequent virtual machines placed on this GPU must also have 1q-vGPU profiles associated therewith. In other words, virtual machines cannot have any other profile other than the 1q-vGPU profile in order to be placed on the GPU. This restriction causes power-on failures even when a sufficient number of GPUs are available to place and execute the virtual machine.

In a specific example, assume two GPUs, GPU-A and GPU-B, reside in a data center. A GPU can support two virtual machines with 12q-vGPU profiles, and another GPU can support one virtual machine with a 24q-vGPU profile. Also assume, initially, that GPU-A and GPU-B have no virtual machines associated therewith. First, a user powers on a first virtual machine having a 12q-vGPU profile. The first virtual machine is placed on a host with GPU-A. Second, a user powers on a second virtual machine with a 12-q vGPU profile. For the purposes of load balancing, the second virtual machine is placed on host a host with GPU-B. Third, a user powers on a third virtual machine having a 24q-vGPU profile. This power on fails because there is no GPU available to power on a 24q profile vGPU virtual machine. This sequence of events lead to a power-on failure. More specifically, when a user launches a virtual machine that requires vGPU resources, the virtual machine cannot be executed and/or the vGPU resources cannot be provided due to lack of virtual resources, even though underlying physical computing resources are available.

Accordingly, various examples are described herein for avoiding power-on failures during virtualization of graphics processing units. In some examples, a computing environment includes one or more computing devices directed to identifying a profile for a virtual graphics processing unit designated for the virtual machine, for instance, in response to a virtual machine being powered on, where the profile specifies an amount of memory required by the vGPU. The one or more computing devices can be further directed to identify that the virtual machine is unable to be assigned to any of a plurality of physical graphics processing units (GPUs) based on the amount of memory required by the vGPU, free up at least the amount of memory required by the vGPU by performing a migration of at least one existing virtual machine from a first one of the physical GPUs to a second one of the physical GPUs, and assign the virtual machine to an available one of the physical GPUs and a corresponding host.

In some examples, the one or more computing devices can be directed to perform the migration by placing all of the physical GPUs in a list associated with a NO-PROFILE category, for instance, before assigning any of the virtual machines to a respective one of the physical GPUs. In response to a first one of the virtual machines being powered on and the list associated with the NO-PROFILE category being non-empty, the one or more computing devices can assign the first one of the virtual machines to any one of the physical GPUs in the list associated with the NO-PROFILE category, power on the one of the virtual machine, remove the one of the physical GPUs on which the first one of the virtual machines is placed from the list associated with the NO-PROFILE category, and add the one of the physical GPUs on which the first one of the virtual machines is placed to an active GPU list designating a profile of the first one of the virtual machines and an identifier for the one of the physical GPUs.

In some examples, the one or more computing devices can be directed to perform the migration by obtaining a list of active GPUs, attempting placement of the one of the virtual machines on each of the physical GPUs in the list of active GPUs, determining that at least one of the physical GPUs can be freed up by consolidating the virtual machines on the physical GPUs, and invoking a routine to consolidate the virtual machines on the physical GPUs. The routine can include iterating through a list of the physical GPUs corresponding to a profile for a type of vGPU, determining that a number of the physical GPUs is less than a maximum number of GPUs permitted for the type of vGPU, and migrating a first virtual machine on a first host utilizing a first one of the physical GPUs to a second host utilizing a second one of the physical GPUs, for example, in an instance in which the number of the physical GPUs is less than the maximum number of GPUs permitted for the type of vGPU.

In some examples, the profile for the vGPU is one of a P40-1q profile, a P40-2q profile, a P40-3q profile, a P40-4q profile, a P40-6q profile, a P40-8q profile, a P40-12q profile, and a P40-24q profile. Further, in some examples, the one or more computing devices is further directed to perform the migration by maintaining a sorted list of identifiers for the physical GPUs in an ascending order or in a descending order.

Turning now to FIG. 1, an example of a networked environment 100 is shown. The networked environment 100 can include a computing environment 103 and various computing systems 106 in communication with one other over a network 108. The network 108 can include, for example, the Internet, intranets, extranets, wide area networks (WANs), local area networks (LANs), wired networks, wireless networks, other suitable networks, or any combination of two or more such networks.

The networks of the networked environment 100 can include satellite networks, cable networks, Ethernet networks, telephony networks, and other types of networks. The computing systems 106 can include devices installed in racks 112a . . . 112n (collectively "racks 112"), which can make up a server bank, aggregate computing system, or a computer bank in a data center or other like facility. In some examples, the computing systems 106 can include high-availability computing systems. A high-availability computing system is a group of computing devices that acts as a single system and provides a continuous uptime. The devices in the computing systems 106 can include any number of physical machines, virtual machines, virtual appliances, and software associated therewith, such as operating systems, drivers, hypervisors, scripts, and applications.

The computing systems 106, and the various hardware and software components contained therein, can include infrastructure of the networked environment 100 that can provide one or more computing services 113. Computing services 113 can include virtualization services in some examples. For instance, the computing services 113 can include those that serve up virtual desktops to end users. Thus, the computing environment 103 can also be described as a virtual desktop infrastructure (VDI) environment in some examples. In other examples, the computing services 113 can include those that provide a public cloud computing environment, a private cloud computing environment, or a hybrid cloud computing environment, which includes a combination of a public and private cloud computing environment. As such, the computing environment 103 can be referred to as a cloud computing environment in some examples.

The computing environment 103 can include an enterprise computing environment that includes hundreds or even thousands of physical machines, virtual machines, and other software implemented in devices stored in racks 112, distributed geographically, and connected to one another through the network 108. As such, the computing environment 103 can be referred to as a distributed computing environment in some examples. It is understood that any virtual machine or virtual appliance is implemented using at least one physical device, such as a server or other computing device. For instance, a virtual graphics processing unit offered as a computing service 113 can be implemented using one or more physical graphics processing units.

The devices in the racks 112 can include various physical computing resources 114. The physical computing resources 114 can include, for example, physical computing hardware, such as memory and storage devices, servers 115a . . . 115n, switches 118a . . . 118n, graphics cards having one or more GPUs 121a . . . 121n installed thereon, central processing units (CPUs), power supplies, and similar devices. The devices, such as servers 115 and switches 118, can have dimensions suitable for quick installation in slots 124a . . . 124n on the racks 112. In various examples, the servers 115 can include requisite physical hardware and software to create and manage virtualization infrastructure or a cloud computing environment. Also, in some examples, the physical computing resources 114 can be used to provide virtual computing resources, such as virtual machines or other software, as a computing service 113.

Further, in some examples, the servers 115 can include a pre-configured hyper-converged computing device where a hyper-converged computing device includes pre-tested, pre-configured, and pre-integrated storage, server and network components, including software, that are positioned in an enclosure installed in a slot 124 on a rack 112. Additionally, if a server 115 includes an instance of a virtual machine, the server 115 can be referred to as a "host" while the virtual machine can be referred to as a "guest."

Each server 115, such as representative server 115m, can act as a host in the networked environment 100, and thereby can include one or more virtual machines 126a . . . 126n (collectively "virtual machines 126"). In some examples, a hypervisor 128 can be installed on a server 115 to support a virtual machine execution space within which one or more virtual machines 126 can be concurrently instantiated and executed. The hypervisor 128 can include the ESX™ hypervisor by VMware®, the ESXi™ hypervisor by VMware®, or similar hypervisor 128, in some examples. It is understood that the computing systems 106 can be scalable, meaning that the computing systems 106 in the networked environment 100 can increase or decrease dynamically to include or remove servers 115, switches 118, GPUs 121, power sources, and other components without downtime or otherwise impairing performance of the computing services 113 offered up by the computing systems 106.

Further, in some examples, the computing services 113 can be provided through execution of an application or service on one or more of the virtual machines 126. For instance, the computing services 113 can include, for example, web services that can be invoked through an application programming interface (API) by submitting requests over the network 108 for particular actions to be performed or for particular data to be returned. Additionally, in some examples, the computing services 113 can be implemented in computing containers, where each of the containers can include a self-contained execution environment having its own CPU, memory, block input/output (I/O), and network resources which is isolated from other containers.

Referring now to the computing environment 103, the computing environment 103 can include, for example, a server or any other system providing computing capability. Alternatively, the computing environment 103 can include one or more computing devices that are arranged, for example, in one or more server banks, computer banks, computing clusters, or other arrangements. The computing environment 103 can include a grid computing resource or any other distributed computing arrangement. The computing devices can be located in a single installation or can be distributed among many different geographical locations. The computing environment 103 can include or be operated as one or more virtualized computer instances in some examples. Although shown separately from the computing systems 106, it is understood that in some examples the computing environment 103 can be included as all or a part of the computing systems 106.

For purposes of convenience, the computing environment 103 is referred to herein in the singular. Even though the computing environment 103 is referred to in the singular, it is understood that a plurality of computing environments 103 can be employed in the various arrangements as described above. As the computing environment 103 communicates with the computing systems 106 and client devices 109 over the network 108, sometimes remotely, the computing environment 103 can be described as a remote computing environment 103 in some examples. Additionally, in various examples, the computing environment 103 can be implemented in servers 115 of a rack 112, and can manage operations of a virtualized or cloud computing environment through interaction with the computing services 113.

The computing environment 103 can include a data store 131. The data store 131 can include memory of the computing environment 103, mass storage resources of the computing environment 103, or any other storage resources on which data can be stored by the computing environment 103. The data store 131 can include memory of the servers 115 in some examples. For instance, the data store 131 can include one or more relational databases, such as structure query language (SQL) databases, non-SQL databases, or other relational or non-relational databases. The data stored in the data store 131, for example, can be associated with the operation of the various services or functional entities described below.

The data store 131 can include a database or other memory that includes, for example, GPU lists 135, vGPU profiles 190, as well as other data. The GPU lists 135 can include various tables corresponding to physical GPUs 121 operating in the networked environment 100. In some examples, the GPU lists 135 can include GPU identifiers 138 for each of the GPUs 121. The GPU identifiers 138 can include, for example, alphanumeric characters or other suitable characters for uniquely identifying a GPU 121.

Each of the virtual machines 126 in the networked environment 100 can have a corresponding vGPU profile 190. Generally, the vGPU profile 190 provides performance characteristics for a vGPU to be utilized by a virtual machine 120. For instance, a vGPU profile 190 can specify an amount of graphics memory each virtual machine 126 is able to access, in addition to other performance criteria. As a result, administrators are able to select a vGPU profile 190 that is beneficial for graphics-intensive use cases, while allocating a different vGPU profile 190 on less graphics-intensive applications.

The components executed on the computing environment 103 can include, for example, a computing environment management service 145 as well as other applications, services, processes, systems, engines, or functionality not discussed in detail herein. The computing environment management service 145 can oversee the operation of the networked environment 100 through management of the computing systems 106 as well as the physical and virtual computing resources 114 that make up the computing systems 106. In some examples, an enterprise, organization, or other entity can operate the computing environment management service 145 to oversee or manage the operation of devices in the racks 112, such as servers 115, switches 118, GPUs 121, power supplies, cooling systems, and other components.

The computing environment management service 145 can include an administrator console that allows administrators of various enterprises to configure various settings and rules for the computing systems 106 and the computing services 113. For example, in an instance in which an enterprise uses the computing environment management service 145 to provide virtual desktops to employees of the enterprise, the computing environment management service 145 can serve up an administrator portal that allows an administrator to define a number of virtual desktops available to client devices 109 and allocate computing resources 114 to the virtual desktops. For instance, the administrator can allocate a certain amount of disk space, memory, CPU resources, GPU resources, and other computing resources 114 to offer virtualization services by way of the computing service 113.

The computing environment management service 145 can include a virtual migration service 160. In some examples, the virtual migration service 160 performs live migrations of active virtual machines 126 from one physical server 115 to another server 115 with zero downtime and continuous service availability. To this end, the virtual migration service 160 can permit an administrator to allocate pools of computing resources 114, perform hardware maintenance without downtime, and migrate virtual machines 126 away from failing or underperforming servers 115.

In further examples, the virtual migration service 160 can perform live migrations of virtual services other than a virtual machine 126 from one physical computing resource 114 to another. For instance, in some examples, the virtual migration service 160 can migrate a vGPU from one GPU 121 to another GPU 121 with zero downtime and continuous service availability. As such, in some examples, the virtual migration service 160 can include vMotion® by VMware®, or other similar service.

Ultimately, the various physical and virtual components of the computing systems 106 can process workloads 150a . . . 150n. Workloads 150 can refer to the amount of processing that a server 115, switch 118, GPU 121, or other physical or virtual component has been instructed to process or route at a given time. The workloads 150 can be associated with virtual machines 126, public cloud services, private cloud services, hybrid cloud services, virtualization services, device management services, or other software executing on the servers 115. For instance, the workloads 150 can include tasks to be processed to provide employees of an enterprise with remote desktop sessions, cloud environment, or other virtualized computing infrastructure.

The computing environment management service 145 can maintain a listing of active or inactive workloads 150 as well as oversee the assignment of various workloads 150 to various devices in the computing systems 106. For instance, the computing environment management service 145 can assign a workload 150 lacking available resources to a server 115 that has resources sufficient to handle the workload 150. The workloads 150 can be routed to various servers 115 by the switches 118 as network traffic 155a . . . 155b.

Figure 2:
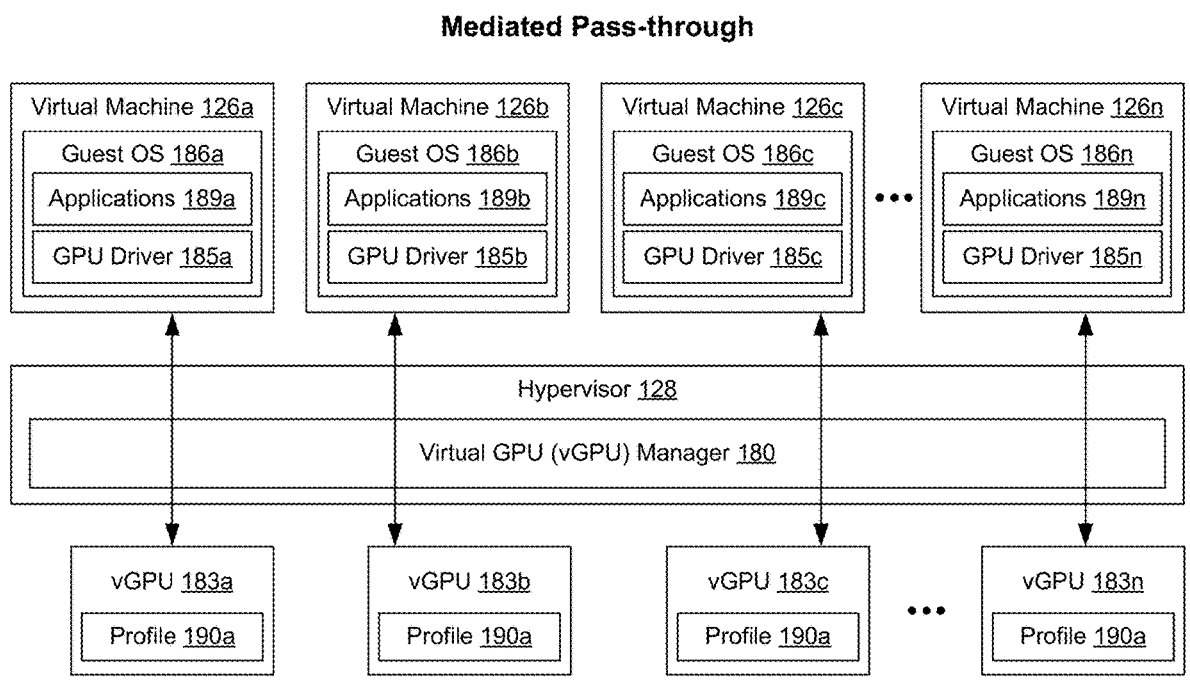
FIG. 2 is a schematic diagram illustrating mediated pass-through for virtual machines using virtualized GPUs.

Referring now to FIG. 2, a schematic diagram illustrating mediated pass-through is shown. Mediated pass-through refers to the allocation of resources of a physical GPU 121 to the hypervisor 128 for use by one or more virtual machines 126. In one example, an end user accessing a virtual machine 126 for a remote desktop session can receive benefits of pass-through, for instance, as the remote desktop session uses the processing capability and memory of a physical GPU 121 through one or more virtual GPUs 183a . . . 183n. To perform pass-through, the virtual machine 126 can include GPU drivers 185a . . . 185n that enable applications 189a . . . 189n, such as video game, remote desktop, or other graphics-intensive applications 189, to access resources of a physical GPU 121 by interacting with a vGPU 183.

To mediate pass-through, the hypervisor 128 can include a vGPU manager 180 according to various examples. Generally, the vGPU manager 180 provides one or more vGPUs 183 that enable multiple virtual machines 126 to concurrently and directly access a single physical GPU 121, for instance, using GPU drivers 185a . . . 185n that are deployed on guest operating systems 186a . . . 186n. In some examples, the vGPU manager 180 can be installed and executed in a hypervisor layer, which can include ESX by VMware® or similar service. The vGPU manager 180 can include the GRID vGPU manager by NVIDIA® in some examples. The vGPU manager 180 can virtualize underlying physical GPUs 121, offering up one or more vGPUs 183. In some examples, the vGPU manager 180 can divide graphics memory of physical GPUs 121 into equal partitions and assign each partition to a virtual machine 126.

It is understood that each of the virtual machines 126 can have a corresponding vGPU profile 190a . . . 190n. The vGPU profile 190 can specify an amount of graphics memory each virtual machine 126 can access, as well as other performance criteria. For instance, an administrator can designate a first vGPU profile 190 for a virtual machine 126 that is beneficial for graphics-intensive use cases, while allocating a different profile 190 on less graphics-intensive scenarios. Table 1 lists available NVIDIA® Pascal P40 vGPU profiles 190, the graphics memory for each virtual machine 126, and the maximum number of virtual machines 126 permitted per physical GPU 121 for each profile type.

TABLE 1

| vGPU Profiles for NVIDIA ® Pascal GPU | | |
|---|---|---|
| vGPU type | Graphics Memory per VM (in GB) | Maximum vGPUs per Physical GPU |
| P40-1q | 1 | 24 |
| P40-2q | 2 | 12 |
| P40-3q | 3 | 8 |

TABLE 1-continued

| vGPU Profiles for NVIDIA ® Pascal GPU | | |
|---|---|---|
| vGPU type | Graphics Memory per VM (in GB) | Maximum vGPUs per Physical GPU |
| P40-4q | 4 | 6 |
| P40-6q | 6 | 4 |
| P40-8q | 8 | 3 |
| P40-12q | 12 | 2 |
| P40-24q | 24 | 1 |

Some physical GPUs 121, such as those manufactured by NVIDIA®, can have only one profile 190 assigned to the GPU 121. Therefore, all the virtual machines 126 placed on a GPU 121 must have the same profile 190. For example, referring to Table 1 above, if a P40-1q profile 190 is assigned to a GPU 121, then all the virtual machines 126 placed on this GPU 121 must be associated with a P40-1q profile 190. Notably, this restriction causes power-on failures, even when a sufficient number of GPUs 121 are available to place a virtual machine 126 and power on the virtual machine.

As can be seen in Table 1, a GPU 121 can support two virtual machines 126 with 12-q profiles 190 and another GPU 121 can support one virtual machine 126 with a 24-q profile. As an example of a failure in powering on a virtual machine 126, assume two GPUs 121 reside in a data center, where a first GPU 121a and a second GPU 121b have no virtual machines 126 associated therewith. A user powers on a first virtual machine 126 having a 12q-vGPU profile 190. The hypervisor 128 places the first virtual machine 126a on a host with a first GPU 121a. Now assume that a user powers on a second virtual machine 126b having a 12q-vGPU profile 190. For purposes of load balancing, the hypervisor 128 will place the second virtual machine 126b on a host with a second GPU 121b. Now, assume a user powers on a third virtual machine 126. The third virtual machine 126, however, has a 24-q vGPU profile 190. A power on failure will occur as there is no GPU 121 available to power on a virtual machine 126 having a 24q vGPU profile 190, even though a sufficient amount of memory exists between the first GPU 121a and the second GPU 121b. As a result, non-usable memory segments are created over time.

Notably, the power-on failure could not be avoided before the introduction of live migration of vGPU-enabled virtual machines 126. According to the various examples described herein, the virtual migration service 160 can migrate vGPU-enabled virtual machines 126 and free memory for placement of a virtual machine 126 having a new vGPU profile 190. As a result, the power-on failure for the vGPU-enabled virtual machine 126 is avoided.

According to various embodiments herein, the virtual migration service 160 can migrate vGPU-enabled virtual machines 126 from one host to another to consolidate and/or free non-used memory available on or more GPUs 121. With respect to the migration of vGPU-enabled virtual machines 126, again, assume two GPUs 121 reside in a data center, where a first GPU 121a and a second GPU 121b have no virtual machines 126 associated therewith. A user powers on a first virtual machine 126 having a 12q-vGPU profile 190. The hypervisor 128 places the first virtual machine 126a on a host with a first GPU 121a. Now assume that a user powers on a second virtual machine 126b having a 12q-vGPU profile 190. For purposes of load balancing, the hypervisor 128 will place the second virtual machine 126b on a host with a second GPU 121b. Now, assume a user powers on a third virtual machine 126, where the third virtual machine 126 has a 24-q vGPU profile 190. While there is no GPU 121 available to place and execute the virtual machine 126, the first vGPU-enabled virtual machine 126 can be migrated from the first GPU 121a to the second GPU 121b. Since the 12-q profile 190 is assigned to GPU 121b, the virtual migration service 160 can move 12q-vGPU virtual machine 126 to GPU 121b, thus, freeing GPU 121a. Now, the 24-q profile virtual machine 126 can be assigned to GPU 121a, placed on a corresponding host, and successfully powered on.

Turning next to FIG. 3, pseudocode for powering on a virtual machine 126 is shown according to various examples. The pseudocode, or similar code, can be executed by the computing environment 103, for instance, when a virtual machine 126 is powered on by an end user or an automated service. The routines defined in the pseudocode utilize various lists that can be implemented using one or more relational or non-relational databases stored in memory of the computing environment 103.

For example, the computing environment 103 can maintain a list of GPUs 121 for each profile 190, including those having no-profile, in the data store 131. Table 2 below includes an example list that can be maintained by the computing environment 103. Specifically, Table 2 includes identifiers for GPUs 121 that are sorted in ascending order based on a number of virtual machines 126 running on the GPU 121. While shown in ascending order, it is understood that the computing environment 103 can maintain the list of identifiers in descending order in some examples. The ascending or descending nature of the lists can facilitate a quick search routine, as will be appreciated.

TABLE 2

PROFILE_TO_GPUS: vGPU Profiles and GPU IDs

| vGPU Profiles | Sorted List of GPU IDs |
|---|---|
| no-profile | (1, 3, 5) |
| P40-1q | (2, 6, 4) |
| P40-2q | (7, 9) |
| P40-3q | (8, 12, 13) |
| P40-4q | (14) |
| P40-6q | (15, 16, 20) |
| P40-8q | (17, 18, 19) |
| P40-12q | (21, 22,) |
| P40-24q | (23, 24) |

Further, the computing environment 103 can maintain a list that details a number of virtual machines 126 running on a GPU 121, along with identifiers for the corresponding host, as shown in Table 3 below.

TABLE 3

GPU_TO_NUM_VMS: GPU IDs and Number of VMs Running Thereon

| GPU IDs | No. of VMs Running | HOST_IDs |
|---|---|---|
| 1 | 0 | H1 |
| 2 | 11 | H3 |
| 3 | 0 | H4 |
| 4 | 12 | H24 |
| 5 | 0 | H7 |
| 6 | 11 | H9 |
| 7 | 6 | H20 |
| ... | ... | |
| 24 | 1 | H2 |

In some example, the computing environment 103 can further maintain a list that details a maximum number of virtual machines 126 supported for each vGPU profile 190, as shown in Table 4 below. It is understood that, in some examples, the list can include a static list that does not require periodic updates by the computing environment 103.

TABLE 4

PROFILE_TO_MAX_VMS vGPU Profiles for NVIDIA ® Pascal GPU

| vGPU Profile | Maximum vGPUs per Physical GPU |
|---|---|
| P40-1q | 24 |
| P40-2q | 12 |
| P40-3q | 8 |
| P40-4q | 6 |
| P40-6q | 4 |
| P40-8q | 3 |
| P40-12q | 2 |
| P40-24q | 1 |

Referring now to code segment 303, the computing environment 103 can maintain a list that includes all GPUs 121, where initially each GPU 121 is associated with a NO-PROFILE category, for instance, in a table similar to Table 2. When a user attempts to power on a virtual machine 126, the computing environment 103 can check the list of GPUs 121 associated with the NO-PROFILE category. If the list of GPUs 121 in the NO-PROFILE category row is not empty (meaning the virtual machine 126 can be assigned to at least one GPU 121), the computing environment 103 can assign the virtual machine 126 to any of the GPUs 121 in the list and, thereafter, power on or otherwise execute the virtual machine 126. The computing environment 103 can remove the designated GPU 121 from the list associated with the NO-PROFILE category and add the designated GPU 121 to an appropriate row of the table, for instance, based on the profile 190 specified for the virtual machine 126. The computing environment 103 can further place the virtual machine 126 on a host corresponding to the designated GPU 121.

Referring to code segment 306, if the list of GPUs 121 in the NO-PROFILE category row is empty (meaning virtual machines 126 and vGPU profiles 190 have been assigned to all of the available GPUs 121), the computing environment 103 can obtain a list of GPUs 121 corresponding to the vGPU profiles 190 from memory, similar to Table 2 shown above. The computing environment 103 can then attempt to place the virtual machine 126 on each of the GPUs 121 in the list. However, if all the GPUs 121 are running a maximum number of virtual machines 126 based on the vGPU profile 190, the computing environment 103 can determine whether any of the GPUs 121 can be freed by consolidating the virtual machines 126 on the GPUs 121.

Code segment 309 can be executed by the computing environment 103 to consolidate virtual machines 126 on the GPUs 121. As shown in code segment 309, the computing environment 103 can execute a freeupGPU(profile) routine for each vGPU profile 190 in a list of applicable vGPU profiles 190.

In some examples, the computing environment 103 can call or otherwise invoke a routine having pseudocode shown in FIGS. 4 and 5. With respect to FIG. 4, the computing environment 103 can invoke the freeupGPU(profile) routine for every vGPU profile 190 in the list, with the exception of those being associated with the NO-PROFILE category or vGPU profiles 190 that permit only a single virtual machine 126, such as the P40-24q vGPU profile 190.

The freeupGPU(profile) routine attempts to consolidate virtual machines 126 on the GPUs 121 pointed by PROFILE_TO_GPUS[profile] by performing migrations, potentially freeing a GPU 121 to be utilized by other virtual machines 126 having different vGPU profiles 190. For instance, in code segment 403, the computing environment 103 can determine whether a GPU 121 can be freed based on a vGPU profile 190 and a maximum number of virtual machines 126 permitted for that type of vGPU profile 190.

Referring to code block 406, when the computing environment 103 consolidates and places a virtual machine 126 on a host corresponding to a GPU 121, the computing environment 103 can associate a vGPU profile 190 of the virtual machine 126 with the GPU 121. Further, the computing environment 103 can place the virtual machine 126 on the host corresponding to the GPU 121, and power on the virtual machine 126. The computing environment 103 can update the appropriate lists in the data store 131, as can be appreciated.

Code block 406 invokes a vmMigration( ) routine, which is shown in FIG. 5. In code block 503, the vmMigration( ) routine can invoke an API of the virtual migration service 160 to migrate a vGPU-enabled virtual machine 126 from one host to another without incurring downtime. Again, the computing environment 103 can update the appropriate lists based on the migration, as can be appreciated.

Figure 6:
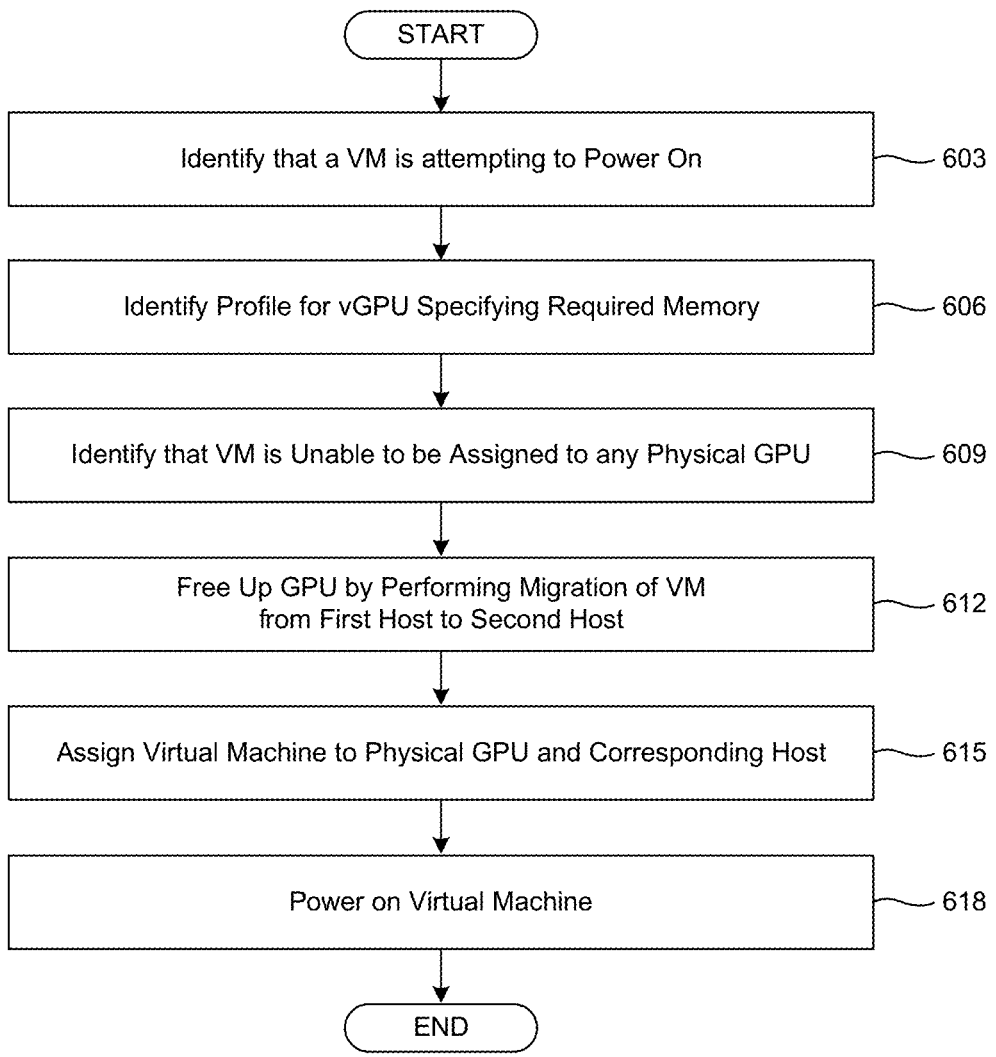
FIGS. 6-8 are flowcharts illustrating functionality implemented by components of the networked computing environment of FIG. 1.

Moving on to FIG. 6, a flowchart is shown that provides one example of the operation of a portion of the networked environment 100. The flowchart of FIG. 6 can be viewed as depicting an example of elements of a method implemented by the computing environment management service 145 or the virtual migration service 160 executing in the computing environment 103 according to one or more examples. The separation or segmentation of functionality as discussed herein is presented for illustrative purposes only.

In step 603, the computing environment 103 can identify that a virtual machine 126 is being powered on or, in other words, identify that a virtual machine 126 is attempting execution on a server 115 or other host. It is understood that, when configuring settings of the virtual machine 126, an administrator or end user may have specified desired performance characteristics, such as desired graphics memory, based on an anticipated use of the virtual machine 126. For instance, an administrator may have specified a high level of desired graphics performance if the administrator is attempting to play a video game, perform video editing, or other graphics-intensive task. Alternatively, an administrator may have specified a low level of desired graphics performance if the administrator is attempting to merely execute a word processing application, which is not graphics-intensive. To this end, the administrator may have assigned a vGPU profile 190 to the virtual machine 126 based on the desired performance characteristics.

Next, in step 606, the computing environment 103 can identify the vGPU profile 190 designated for the virtual machine 126. As can be appreciated, the vGPU profile 190 can specify an amount of memory required by the vGPU 183 to be utilized by the virtual machine 126 among other performance characteristics. For instance, Table 1 lists different vGPU profiles 190 that can be selected by an administrator to assign different amounts of memory to a virtual machine 126.

In step 609, the computing environment 103 can identify that the virtual machine 126 is unable to be assigned to any of a plurality of physical GPUs 121 based on the amount of memory required by the vGPU 183 and the vGPU profile 190. In one example, if a user is attempting to execute a virtual machine 126 that requires 24 GB of memory, the computing environment 103 can identify that an entire GPU 121 is required to service the virtual machine 126. As such, the computing environment 103 will identify that the virtual machine 126 is unable to be assigned to any of a plurality of physical GPUs 121 when an entire GPU 121 in unavailable.

Next, in step 612, the computing environment 103 can free at least the amount of memory required by the vGPU 183, for instance, by performing a migration of at least one existing virtual machine 126 from a first one of the physical GPUs 121 to a second one of the physical GPUs 121, if possible. In other words, a virtual machine 126 executing on a first host utilizing a first GPU 121*a* can be migrated to a second host that utilizes a second GPU 121*b*. Additional information regarding the migration of the virtual machine 126 from a first host to a second host is described in greater detail below.

In step 615, in an instance in which the amount of memory required by the vGPU is freed as a result of the migration, the computing environment 103 can assign the virtual machine 126 to an available one of the physical GPUs 121 and a corresponding host, and power on the virtual machine 126 on the corresponding host.

Figure 7:
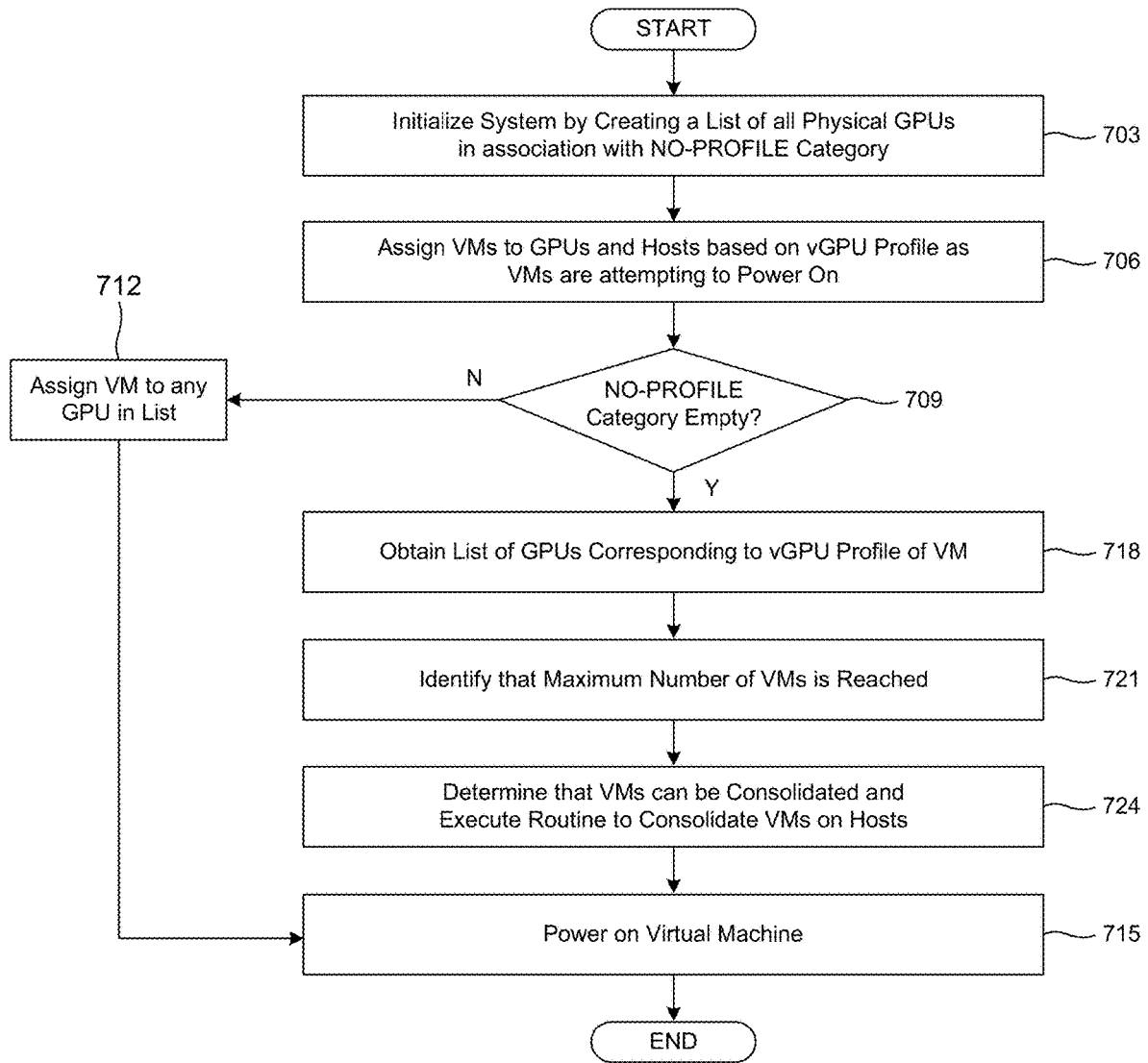

Turning next to FIG. 7, a flowchart is shown that provides one example of the operation of a portion of the networked environment 100. The flowchart of FIG. 7 can be viewed as depicting an example of elements of a method implemented by the computing environment management service 145 or the virtual migration service 160 executing in the computing environment 103 according to one or more examples. The separation or segmentation of functionality as discussed herein is presented for illustrative purposes only.

In step 703, the computing environment 103 can initialize the system by creating a list of all of the physical GPUs 121, where each of the physical GPUs 121 are initially stored in the list in association with a NO-PROFILE category. The computing environment 103 can maintain a list that includes all GPUs 121, where initially each GPU 121 is associated with a NO-PROFILE category, for instance, in a table similar to Table 2. In other words, a virtual machine 126 and/or vGPU profile 190 has yet to be assigned to a physical GPUs 121. In some examples, the computing environment 103 can assign each of the physical GPUs 121 to the NO-PROFILE category 190 prior to assigning any of the virtual machines 126 to a respective one of the physical GPUs 121 for execution.

Thereafter, in step 706, the computing environment 103 can assign virtual machines 126 to GPUs 121 and their corresponding hosts based on a respective vGPU profile 190, for instance, as new virtual machines 126 are attempting to power on.

Next, in step 709, the computing environment 103 can determine whether the NO-PROFILE category in the list is not empty. If the list of GPUs 121 in the NO-PROFILE category row is not empty, meaning the virtual machine 126 can be assigned to at least one GPU 121, the process proceeds to step 712.

In step 712, the computing environment 103 can assign the virtual machine 126 to any of the GPUs 121 in the list. In some examples, the computing environment 103 can remove the designated GPU 121 from the list associated with the NO-PROFILE category. Further, the computing environment 103 can add the GPU 121 on which the virtual machine 126 is placed to an active GPU list designating a profile of the virtual machine 126 and an identifier for the physical GPU 121.

Thereafter, in step 715, the computing environment 103 can place the virtual machine 126 on a host corresponding to the designated GPU 12 and power on or otherwise execute the virtual machine 126. Thereafter, the process can proceed to completion.

Referring again to step 709, in response to the virtual machine 126 being powered on and the list associated with the NO-PROFILE category being empty, the process can proceed to step 718. In step 718, if the list of GPUs 121 in the NO-PROFILE category row is empty (meaning virtual machines 126 and vGPU profiles 190 have been assigned to all of the available GPUs 121), the computing environment 103 can obtain a list of GPUs 121 corresponding to the vGPU profiles 190 from memory, similar to Table 2 shown above. The computing environment 103 can then attempt to place the virtual machine 126 on each of the GPUs 121 in the list.

However, if all the GPUs 121 are running a maximum number of virtual machines 126 based on the vGPU profile 190, the computing environment 103 can determine whether any of the GPUs 121 can be freed by consolidating the virtual machines 126 on the GPUs 121. Accordingly, in step 721, the computing environment 103 can identify that a maximum number of virtual machines 126 hosted by a GPU 121 has been reached.

In step 724, in an instance in which each of the physical GPUs 121 in the list of active GPUs are running a maximum number of virtual machines 126 for a vGPU profile 190, the computing environment 103 can determine that at least one of the physical GPUs 121 can be freed up by consolidating the virtual machines on the physical GPUs and, thereafter, the computing environment 103 can execute a routine to consolidate the virtual machines 126 on the physical GPUs 121. Execution of the routine is described in greater detail below with respect to FIG. 8. Thereafter, the process can proceed to completion.

Figure 8:
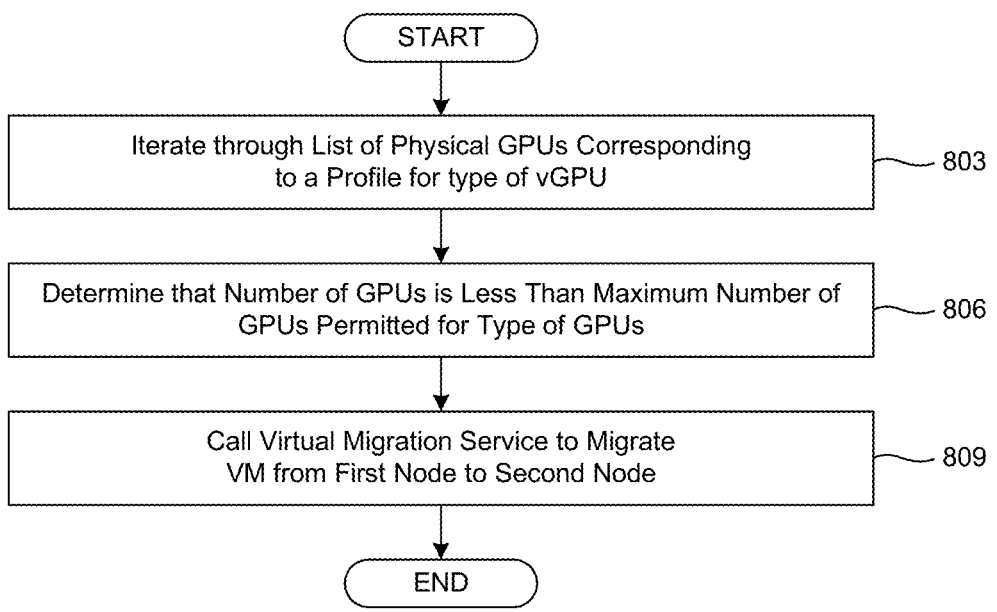

Moving on to FIG. 8, a flowchart is shown that provides one example of the operation of a portion of the networked environment 100. The flowchart of FIG. 8 can be viewed as depicting an example of elements of a method implemented by the computing environment management service 145 executing in the computing environment 103 according to one or more examples. The separation or segmentation of functionality as discussed herein is presented for illustrative purposes only.

Initially, the computing environment 103 can determine whether virtual machines 126 can be consolidated to free resources of a GPU 121. Accordingly, in step 803, the computing environment 103 can iterate through a list of the physical GPUs 121 corresponding to a vGPU profile 190 for a type of vGPU 183. The iteration can be performed to analyze each of the physical GPUs 121 and ensure the proper balancing and distribution of virtual machines 126, and to account for execution of subsequent virtual machines 126.

In step 809, while iterating through the list of the physical GPUs 121, the computing environment 103 can determine that a number of the physical GPUs 121 is less than a maximum number of GPUs 121 permitted for the type of vGPU 183. Further, the computing environment 103 can identify a virtual machine 126 on a GPU 121 different than a particular GPU 121, meaning the virtual machines 126 can be consolidated onto a single GPU 121.

In step 812, in an instance in which the number of the physical GPUs is less than the maximum number of GPUs permitted for the type of vGPU, the computing environment 103 can call the virtual migration service 160 to migrate a virtual machine 126 on a first host utilizing a first one of the physical GPUs 121 to a second host that utilizes a second one of the physical GPUs 121. The computing environment 103 can call or otherwise invoke a routine having pseudo-code, as shown in FIGS. 4 and 5. For instance, in FIG. 4, the computing environment 103 can invoke the freeupGPU (profile) routine for every vGPU profile 190 in the list, with the exception of those being associated with the NO-PROFILE category or vGPU profiles 190 that permit only a single virtual machine 126, such as the P40-24q vGPU profile 190. Thereafter, the process can proceed to completion.

Stored in the memory device are both data and several components that are executable by the processor. Also stored in the memory can be a data store 131 and other data. A number of software components are stored in the memory and executable by a processor. In this respect, the term "executable" means a program file that is in a form that can ultimately be run by the processor. Examples of executable programs can be, for example, a compiled program that can be translated into machine code in a format that can be loaded into a random access portion of one or more of the memory devices and run by the processor, code that can be expressed in a format such as object code that is capable of being loaded into a random access portion of the one or more memory devices and executed by the processor, or code that can be interpreted by another executable program to generate instructions in a random access portion of the memory devices to be executed by the processor. An executable program can be stored in any portion or component of the memory devices including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

Memory can include both volatile and nonvolatile memory and data storage components. In addition, a processor can represent multiple processors and/or multiple processor cores, and the one or more memory devices can represent multiple memories that operate in parallel processing circuits, respectively. Memory devices can also represent a combination of various types of storage devices, such as RAM, mass storage devices, flash memory, or hard disk storage. In such a case, a local interface can be an appropriate network that facilitates communication between any two of the multiple processors or between any processor and any of the memory devices. The local interface can include additional systems designed to coordinate this communication, including, for example, performing load balancing. The processor can be electric or of some other available construction.

Client devices 109 can be used to access user interfaces generated to configure or otherwise interact with the computing environment management service 145. These client devices 109 can include a display upon which a user interface generated by a client application for providing a virtual desktop session (or other session) can be rendered. In some examples, the user interface can be generated using user interface data provided by the computing environment 103. The client device 109 can also include one or more input/output devices that can include, for example, a capacitive touchscreen or other type of touch input device, fingerprint reader, or keyboard.

Although the computing environment management service 145, the virtual migration service 160, the hypervisor 128, and other various systems described herein can be embodied in software or code executed by general-purpose hardware as discussed above, as an alternative, the same can also be embodied in dedicated hardware or a combination of software/general purpose hardware and dedicated hardware. If embodied in dedicated hardware, each can be implemented as a circuit or state machine that employs any one of or a combination of a number of technologies. These technologies can include discrete logic circuits having logic gates for implementing various logic functions upon an application of one or more data signals, application specific integrated circuits (ASICs) having appropriate logic gates, field-programmable gate arrays (FPGAs), or other components.

The sequence diagram and flowcharts show an example of the functionality and operation of an implementation of portions of components described herein. If embodied in software, each block can represent a module, segment, or portion of code that can include program instructions to implement the specified logical function(s). The program instructions can be embodied in the form of source code that can include human-readable statements written in a programming language or machine code that can include numerical instructions recognizable by a suitable execution system such as a processor in a computer system or other system. The machine code can be converted from the source code. If embodied in hardware, each block can represent a circuit or a number of interconnected circuits to implement the specified logical function(s).

Although the sequence diagram flowcharts show a specific order of execution, it is understood that the order of execution can differ from that which is depicted. For example, the order of execution of two or more blocks can be scrambled relative to the order shown. In addition, two or more blocks shown in succession can be executed concurrently or with partial concurrence. Further, in some examples, one or more of the blocks shown in the drawings can be skipped or omitted.

Also, any logic or application described herein that includes software or code can be embodied in any non-transitory computer-readable medium for use by or in connection with an instruction execution system such as, for example, a processor in a computer system or other system. In this sense, the logic can include, for example, statements including program code, instructions, and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can include any one of many physical media, such as magnetic, optical, or semiconductor media. More specific examples of a suitable computer-readable medium include solid-state drives or flash memory. Further, any logic or application described herein can be implemented and structured in a variety of ways. For example, one or more applications can be implemented as modules or components of a single application. Further, one or more applications described herein can be executed in shared or separate computing devices or a combination thereof. For example, a plurality of the applications described herein can execute in the same computing device, or in multiple computing devices.

It is emphasized that the above-described examples of the present disclosure are merely possible examples of implementations set forth for a clear understanding of the principles of the disclosure. Many variations and modifications can be made to the above-described embodiments without departing substantially from the spirit and principles of the disclosure. All such modifications and variations are intended to be included herein within the scope of this disclosure.

Therefore, the following is claimed:

1. A system for avoiding power-on failures during virtualization of graphics processing units, comprising:
   at least one computing device; and
   program instructions stored in memory and executable in the at least one computing device that, when executed by the at least one computing device, direct the at least one computing device to:
   in an instance in which a virtual machine is powered on, identify a profile for a virtual graphics processing unit (vGPU) designated for the virtual machine, the profile specifying an amount of memory required by the vGPU;
   identify that the virtual machine is unable to be assigned to any of a plurality of physical graphics processing units (GPUs) based on the amount of memory required by the vGPU;
   free at least the amount of memory required by the vGPU by performing a migration of at least one existing virtual machine from a first one of the physical GPUs to a second one of the physical GPUs; and
   in an instance in which the amount of memory required by the vGPU is freed as a result of the migration, assign the virtual machine to an available one of the physical GPUs and a corresponding host, and power on the virtual machine on the corresponding host.

2. The system of claim 1, wherein the virtual machine is one of a plurality of virtual machines.

3. The system of claim 2, wherein the at least one computing device is further directed to perform the migration by:
   before assigning any of the virtual machines to a respective one of the physical GPUs, placing all of the physical GPUs in a list associated with a NO-PROFILE category; and
   in an instance in which a first one of the virtual machines is powered on and the list associated with the NO-PROFILE category is non-empty:
   assigning the first one of the virtual machines to any one of the physical GPUs in the list associated with the NO-PROFILE category, and powering on the one of the virtual machine;
   removing the one of the physical GPUs on which the first one of the virtual machines is placed from the list associated with the NO-PROFILE category; and
   adding the one of the physical GPUs on which the first one of the virtual machines is placed to an active GPU list designating a profile of the first one of the virtual machines and an identifier for the one of the physical GPUs.

4. The system of claim 3, wherein the at least one computing device in further directed to perform the migration by:
   in an instance in which the one of the virtual machines is powered on, and the list associated with the NO-PROFILE category is empty:
   obtaining the list of active GPUs;

attempting placement of the one of the virtual machines on each of the physical GPUs in the list of active GPUs;

in an instance in which each of the physical GPUs in the list of active GPUs are running a maximum number of virtual machines for a vGPU profile, determining that at least one of the physical GPUs can be freed up by consolidating the virtual machines on the physical GPUs; and invoking a routine to consolidate the virtual machines on the physical GPUs.

5. The system of claim 4, wherein the routine comprises:

iterating through a list of the physical GPUs corresponding to a profile for a type of vGPU;

determining that a number of the physical GPUs is less than a maximum number of GPUs permitted for the type of vGPU; and in an instance in which the number of the physical GPUs is less than the maximum number of GPUs permitted for the type of vGPU, migrating a first virtual machine on a first host utilizing a first one of the physical GPUs to a second host utilizing a second one of the physical GPUs.

6. The system of claim 4, wherein the profile for the vGPU is one of: a P40-1q profile, a P40-2q profile, a P40-3q profile, a P40-4q profile, a P40-6q profile, a P40-8q profile, a P40-12q profile, and a P40-24q profile.

7. The system of claim 1, wherein the at least one computing device in further directed to perform the migration by maintaining a sorted list of identifiers for the physical GPUs in ascending order or in descending order.

8. A method for avoiding power-on failures during virtualization of graphics processing units, comprising:

in an instance in which a virtual machine is powered on, identifying a profile for a virtual graphics processing unit (vGPU) designated for the virtual machine, the profile specifying an amount of memory required by the vGPU;

identifying that the virtual machine is unable to be assigned to any of a plurality of physical graphics processing units (GPUs) based on the amount of memory required by the vGPU;

freeing at least the amount of memory required by the vGPU by performing a migration of at least one existing virtual machine from a first one of the physical GPUs to a second one of the physical GPUs; and in an instance in which the amount of memory required by the vGPU is freed as a result of the migration, assigning the virtual machine to an available one of the physical GPUs and a corresponding host, and powering on the virtual machine on the corresponding host.

9. The method of claim 8, wherein the virtual machine is one of a plurality of virtual machines.

10. The method of claim 9, wherein the migration is performed by:

before assigning any of the virtual machines to a respective one of the physical GPUs, placing all of the physical GPUs in a list associated with a NO-PROFILE category; and in an instance in which a first one of the virtual machines is powered on and the list associated with the NO-PROFILE category is non-empty:

assigning the first one of the virtual machines to any one of the physical GPUs in the list associated with the NO-PROFILE category, and powering on the one of the virtual machine;

removing the one of the physical GPUs on which the first one of the virtual machines is placed from the list associated with the NO-PROFILE category; and adding the one of the physical GPUs on which the first one of the virtual machines is placed to an active GPU list designating a profile of the first one of the virtual machines and an identifier for the one of the physical GPUs.

11. The method of claim 10, wherein the migration is performed by:

in an instance in which the one of the virtual machines is powered on, and the list associated with the NO-PROFILE category is empty:

obtaining the list of active GPUs;

attempting placement of the one of the virtual machines on each of the physical GPUs in the list of active GPUs;

in an instance in which each of the physical GPUs in the list of active GPUs are running a maximum number of virtual machines for a vGPU profile, determining that at least one of the physical GPUs can be freed up by consolidating the virtual machines on the physical GPUs; and invoking a routine to consolidate the virtual machines on the physical GPUs.

12. The method of claim 11, wherein the routine comprises:

iterating through a list of the physical GPUs corresponding to a profile for a type of vGPU;

determining that a number of the physical GPUs is less than a maximum number of GPUs permitted for the type of vGPU; and in an instance in which the number of the physical GPUs is less than the maximum number of GPUs permitted for the type of vGPU, migrating a first virtual machine on a first host utilizing a first one of the physical GPUs to a second host utilizing a second one of the physical GPUs.

13. The method of claim 8, wherein the profile for the vGPU is one of: a P40-1q profile, a P40-2q profile, a P40-3q profile, a P40-4q profile, a P40-6q profile, a P40-8q profile, a P40-12q profile, and a P40-24q profile.

14. The method of claim 8, wherein the migration is performed by maintaining a sorted list of identifiers for the physical GPUs in ascending order or in descending order.

15. A non-transitory computer-readable medium embodying program instructions for avoiding power-on failures during virtualization of graphics processing units that, when executed on at least one computing device, direct the at least one computing device to:

in an instance in which a virtual machine is powered on, identify a profile for a virtual graphics processing unit (vGPU) designated for the virtual machine, the profile specifying an amount of memory required by the vGPU;

identify that the virtual machine is unable to be assigned to any of a plurality of physical graphics processing units (GPUs) based on the amount of memory required by the vGPU;

free at least the amount of memory required by the vGPU by performing a migration of at least one existing virtual machine from a first one of the physical GPUs to a second one of the physical GPUs; and in an instance in which the amount of memory required by the vGPU is freed as a result of the migration, assign the virtual machine to an available one of the physical GPUs and a corresponding host, and power on the virtual machine on the corresponding host.

16. The non-transitory computer-readable medium of claim 15, wherein the virtual machine is one of a plurality of virtual machines.

17. The non-transitory computer-readable medium of claim 16, wherein the at least one computing device is further directed to perform the migration by:
   before assigning any of the virtual machines to a respective one of the physical GPUs, placing all of the physical GPUs in a list associated with a NO-PROFILE category; and
   in an instance in which a first one of the virtual machines is powered on and the list associated with the NO-PROFILE category is non-empty:
      assigning the first one of the virtual machines to any one of the physical GPUs in the list associated with the NO-PROFILE category, and powering on the one of the virtual machine;
      removing the one of the physical GPUs on which the first one of the virtual machines is placed from the list associated with the NO-PROFILE category; and
      adding the one of the physical GPUs on which the first one of the virtual machines is placed to an active GPU list designating a profile of the first one of the virtual machines and an identifier for the one of the physical GPUs.

18. The non-transitory computer-readable medium of claim 17, wherein the at least one computing device in further directed to perform the migration by:
   in an instance in which the one of the virtual machines is powered on, and the list associated with the NO-PROFILE category is empty:
      obtaining the list of active GPUs;
      attempting placement of the one of the virtual machines on each of the physical GPUs in the list of active GPUs;
      in an instance in which each of the physical GPUs in the list of active GPUs are running a maximum number of virtual machines for a vGPU profile, determining that at least one of the physical GPUs can be freed up by consolidating the virtual machines on the physical GPUs; and
      invoking a routine to consolidate the virtual machines on the physical GPUs.

19. The non-transitory computer-readable medium of claim 18, wherein the routine comprises:
   iterating through a list of the physical GPUs corresponding to a profile for a type of vGPU;
   determining that a number of the physical GPUs is less than a maximum number of GPUs permitted for the type of vGPU; and
   in an instance in which the number of the physical GPUs is less than the maximum number of GPUs permitted for the type of vGPU, migrating a first virtual machine on a first host utilizing a first one of the physical GPUs to a second host utilizing a second one of the physical GPUs.

20. The non-transitory computer-readable medium of claim 15, wherein the at least one computing device in further directed to perform the migration by maintaining a sorted list of identifiers for the physical GPUs in ascending order or in descending order.

* * * * *